United States Patent
Gunaseelan et al.

(10) Patent No.: US 7,310,678 B2
(45) Date of Patent: Dec. 18, 2007

(54) SYSTEM, SERVER, AND METHOD FOR VARIABLE BIT RATE MULTIMEDIA STREAMING

(75) Inventors: Lakshminarayanan Gunaseelan, Milpitas, CA (US); Rammohan Kordale, Sunnyvale, CA (US)

(73) Assignee: Kasenna, Inc., Sunnyvale, CA (US)

( * ) Notice: Subject to any disclaimer, the term of this patent is extended or adjusted under 35 U.S.C. 154(b) by 1076 days.

(21) Appl. No.: 09/917,198

(22) Filed: Jul. 27, 2001

(65) Prior Publication Data

US 2002/0097750 A1   Jul. 25, 2002

Related U.S. Application Data

(60) Provisional application No. 60/221,598, filed on Jul. 28, 2000.

(51) Int. Cl.
*G06F 15/16* (2006.01)

(52) U.S. Cl. .............. 709/230; 709/223; 709/224; 709/232; 370/229; 370/231; 370/232

(58) Field of Classification Search ........ 709/230–232, 709/223–224, 229; 725/94, 98; 370/229–232, 370/429
See application file for complete search history.

(56) References Cited

U.S. PATENT DOCUMENTS

| | | | | |
|---|---|---|---|---|
| 5,640,388 A | * | 6/1997 | Woodhead et al. | 370/468 |
| 5,801,781 A | * | 9/1998 | Hiroshima et al. | 348/441 |
| 5,877,812 A | * | 3/1999 | Krause et al. | 375/240.25 |
| 6,137,834 A | * | 10/2000 | Wine et al. | 375/240 |
| 6,567,409 B1 | * | 5/2003 | Tozaki et al. | 370/395.64 |
| 6,728,270 B1 | * | 4/2004 | Meggers et al. | 370/514 |
| 6,771,644 B1 | * | 8/2004 | Brassil et al. | 370/390 |

* cited by examiner

*Primary Examiner*—Ario Etienne
*Assistant Examiner*—LaShonda Jacobs
(74) *Attorney, Agent, or Firm*—Perkins Coie LLP

(57) ABSTRACT

System, method, and computer program products for implementing techniques for efficient delivery of variable bit rate streaming media assets having a variety of data formats. An embodiment provides delivery system for use in client server computer architecture in which server provides streaming media assets to at least one client over computer network, wherein media assets can have plurality of data formats, including a packet producer that acquires a streaming media asset in packetized form and places time stamps on packets that specify delivery time for each packet, a time stamp packet queue containing the packets with time stamps in a first in, first out order; and a feeder module that removes packets from the time stamp packet queue and transmits the removed packets to a client via the computer network, transmission for each packet concluded at least by the specified delivery time in each packet.

39 Claims, 7 Drawing Sheets

SYSTEM, SERVER, AND METHOD FOR VARIABLE BIT RATE MULTIMEDIA STREAMING

RELATED APPLICATIONS

This application claims priority to U.S. Provisional Patent Application Ser. No. 60/221,598, filed Jul. 28, 2000, with the United States Patent and Trademark Office, which is incorporated herein by reference.

FIELD

The present invention relates broadly to delivery of streaming media assets over a computer network having a client server computer architecture. Specifically, the present invention relates to delivery of streaming media assets having variable bit rates and multiple data formats.

BACKGROUND

Multimedia data can be streamed and encoded in many different ways. One aspect of encoding deals with uniformity or variation in the streaming bit rate. The characteristics of the data have implications on design on numerous components of the end to end streaming server system. These components include resources on the server such as disk bandwidth, CPU, memory and network bandwidth on the server, the CPU, memory and network bandwidth on the client as well as the network itself. Delivery of variable bit rate streaming multimedia data presents numerous challenges even with a single data format, but the level of difficulty is increased dramatically when streaming media assets of multiple data formats are to be delivered on a single system.

Another problem streaming media servers face is the resolution of streaming media assets that have to be delivered simultaneously. Scheduling simultaneous delivery has involved large, parallel infrastructure for delivering multiple streams simultaneously in previous approaches that results in idle system resources for an unacceptable amount of time. Idle resources translate directly into higher operating costs and reduced profits for commercial servers. Thus, there is a need for servers that can more efficiently deliver streaming media assets simultaneously to multiple users using infrastructure that is flexible to a variety of media formats.

SUMMARY

The present invention provides a system, methods, and computer program products that implement efficient techniques for variable bit multimedia streaming. In one aspect, the present invention provides a delivery system, methods, and computer executable instructions for use in a client server computer architecture in which the server provides streaming media assets to at least one client over a computer network, wherein the media assets can have a plurality of data formats, comprising a packet producer that acquires a streaming media asset in packetized form and places time stamps on the packets, the time stamps specifying a delivery time for each packet, a time stamp packet queue containing the packets with time stamps in a first in, first out order; and a feeder module that removes packets from the time stamp packet queue and transmits the removed packets to a client via the computer network, the transmission for each packet concluded at least by the specified delivery time in each packet.

In another aspect, the present invention provides a system, methods, and computer executable code for resolving delivery timestamp conflicts between packets from multiple streaming media assets by comparing the delivery times of the packets, and, when a conflict between two or more packets arises, adjusting the delivery timestamp on one or more packets to deliver the packets within the time allowed by the Pre-read size value on the client or by delivering the packets at a time other than the original delivery time specified by the timestamp if the MaxBufSize on the client is large enough to hold additional packets.

In another aspect, the present invention provides a system, methods, and computer executable code for performing admission control for streaming media assets delivered to a client in a client server computer architecture in which the server provides streaming media assets to at least one client over a computer network, by defining a time window in terms of a duration of time, computing a number of bytes that need to be delivered during the time window, the bytes comprising a streaming media asset, translating the computed number of bytes into a time to process value for the first streaming media asset, and admitting for delivery the streaming media asset if the first time to process value is smaller than the time window. Additional streaming media assets can be admitted if their respective time to process values, when added to the first admitted asset for the same time space, is still less than the time window.

DETAILED DESCRIPTION

Figure 1:
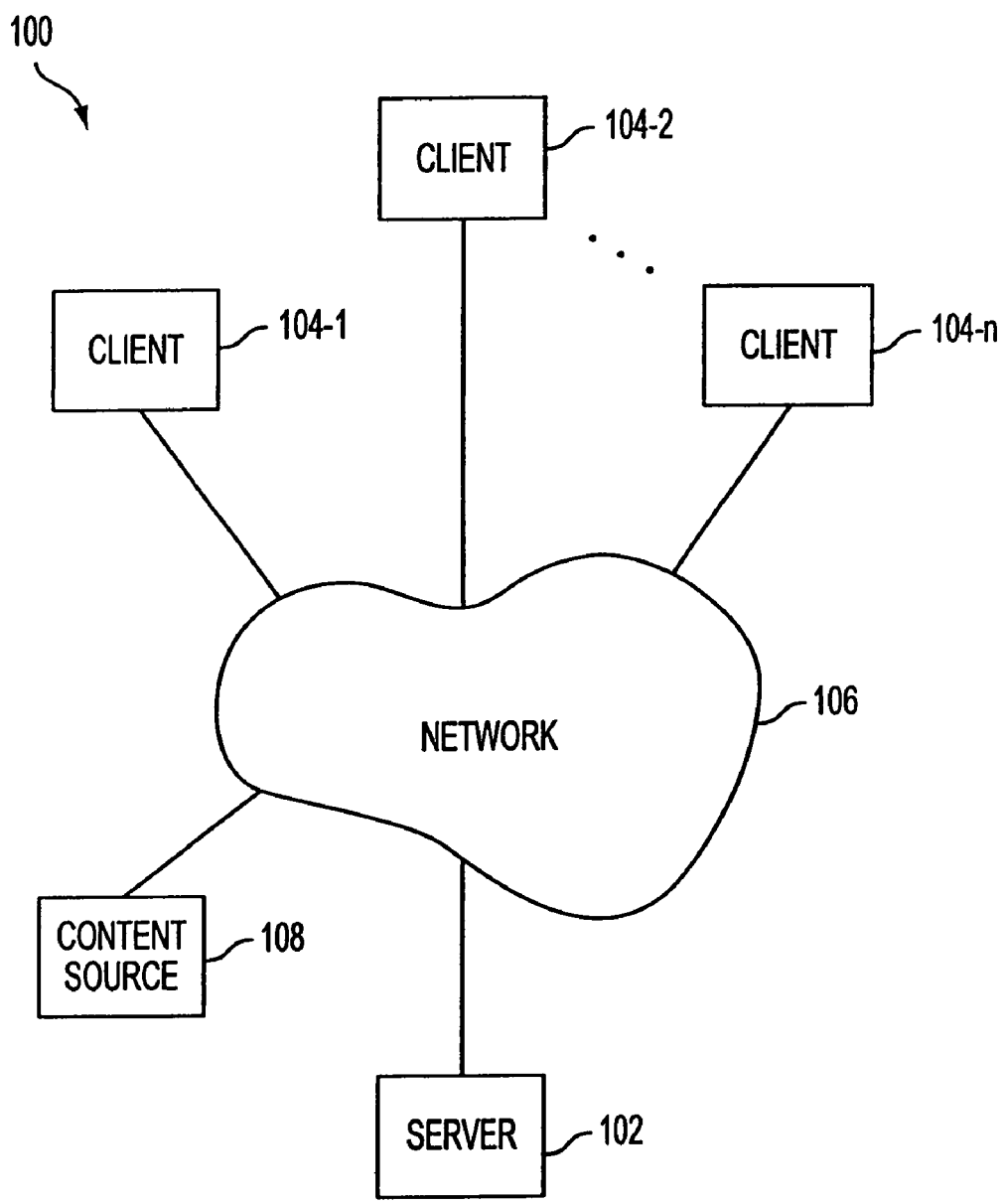
FIG. 1 illustrates in block diagram form the client server architecture utilized in embodiments of the present invention.
Figure 5:
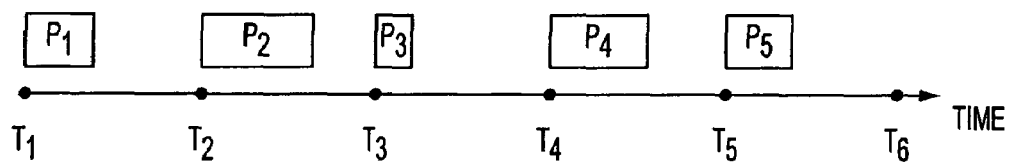
FIG. 5 illustrates delivery of packets having variable size at regular delivery time intervals according to an embodiment of the invention.

Directing attention to FIG. 1, the present invention utilizes a client-server computer architecture 100 implemented over a large, public network such as the Internet. Server 102 is responsible for distributing streaming media assets such as video, audio, static images, graphics, or a combination thereof to clients 104-1, 104-2, . . . , 104-n, where n is the number of clients requiring streaming media assets, via public computer network 106. Media assets are streamed by transmitting a sequence of packets from server 102 to client 104, which plays the media asset on a computer monitor, or over an audio device, or other suitable device using a media player program that decompresses, decodes, and performs any necessary processing on the sequence of packets received from server 102 to present aural or visual presentation contained in the packets to a user. Examples of streaming media assets include movies, newscasts, music, graphics, animation, slide presentations, and the like, all of which are capable of being presented in a serial fashion to a human user. Server 102 may be a source of the streaming media assets. Optionally, one or more third party content providers such as content provider 108 may be in communication with server 102, and provide the streaming media assets to server 102 over network 106. Media assets are typically stored in files in the memory of server 102 and distributed to clients on demand or according to a schedule. A property that is common to various techniques for streaming of variable bit rate multimedia data involves delivering variable size data packets at discrete points in time (with variable interval) over a stream's delivery timeline. As an example, consider FIG. 5 which shows data packets P1, P2, etc. that are due at times t1, t2, etc. The packets are of different sizes and the time interval between t1, t2, etc. varies. Contrast this with constant bit rate (CBR) delivery which involves streaming fixed size packets of data over fixed time intervals.

Figure 2:
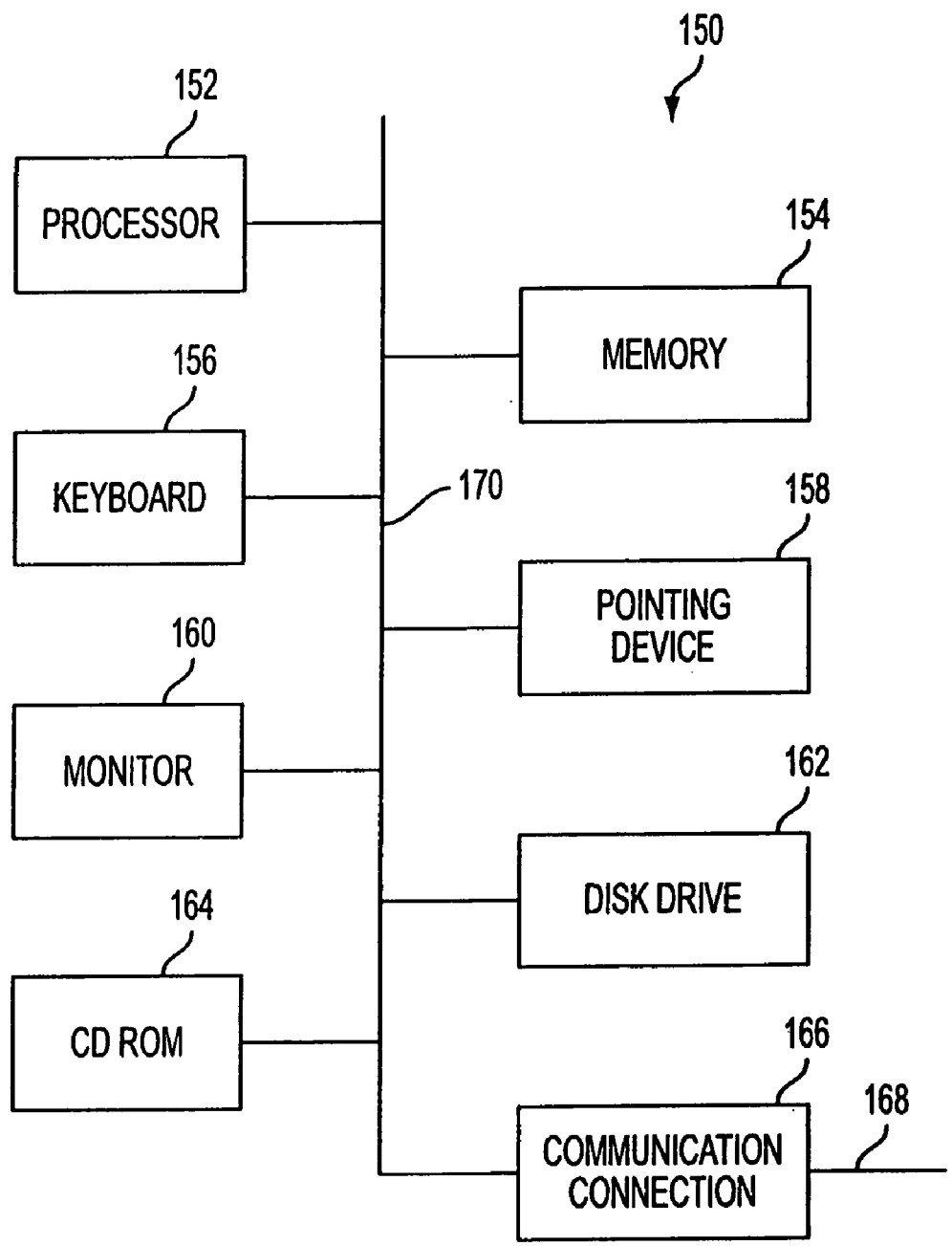
FIG. 2 illustrates in block diagram form the elements of a computer as utilized in embodiments of the present invention.

FIG. 2 illustrates in block diagram form the major components included in a computer embodying either server 102 or client 104. Computer 150 incorporates processor 152 such as a central processing unit (CPU) and supporting integrated circuitry. In an embodiment, work stations such as Sun Ultra computers available from Sun Microsystems, Inc., of Santa Clara, Calif., can be used as server 102. Personal computers such as those available from Dell Inc., of Austin, Tex., may be used for client computers 104. However, in general any type of computer may be used for server 102 and any type of computer or even various information appliances may be used for client 104. Memory 154 may include one or more of RAM and NVRAM such as flash memory, to facilitate storage of software modules executed by processor 152, and file systems administering media assets. As referred to herein, a file system refers to any administrative entity implemented by computer 150 to organize and administer media assets. File systems can include conventional file systems, direct attached storage, network attached storage, storage area networks, both block based and file based, raw storage, and the like. Also included in computer 150 are keyboard 156 or other input device, pointing device 158, and monitor 160, which allow a user to interact with computer 150 during execution of software programs. Mass storage devices such as disk drive 162 and CD ROM 164 may also be in computer 150 to provide storage for computer programs, associated files, and media assets. In one embodiment, database products available from Oracle Corp. of Redwood Shores, Calif, may be utilized in connection with file systems as a database and database server.

Computer 150 communicates with other computers via communication connection 166 and communication line 168 to allow computer 150 to be operated remotely, or utilize files stored at different locations, such as content provider 108. Communication connection 166 can be a modem, network interface card, or other device that enables a computer to communicate with other computers. Communication line 168 can be a telephone line or cable, or any medium or channel capable of transferring data between computers. In alternative embodiments, communication connection 166 can be a wireless communication medium, thus eliminating the need for communication line 168. The components described above may be operatively connected by a communications bus 170.

Figure 3:
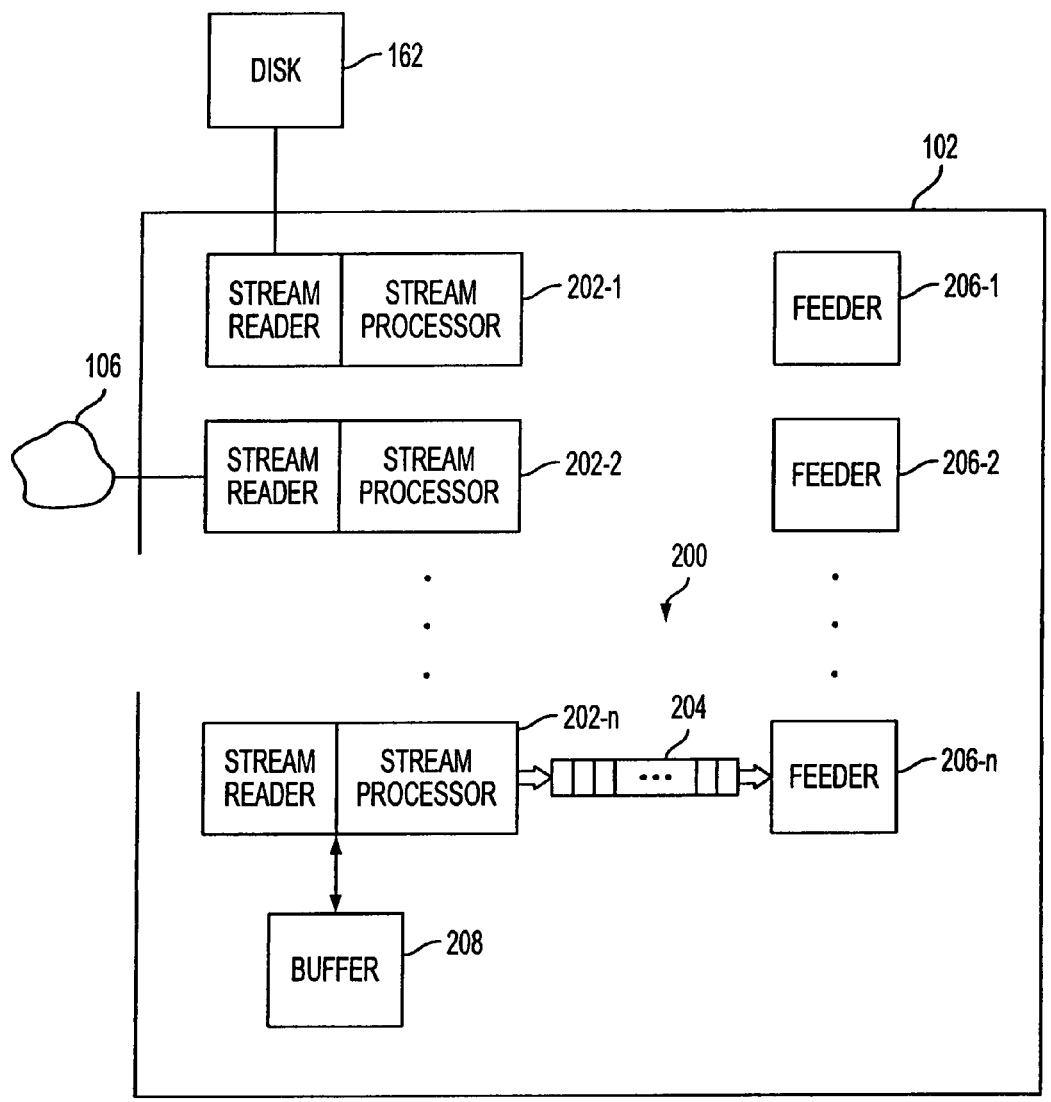
FIG. 3 illustrates in block diagram form functional elements included in the server as utilized in embodiments of the present invention.
Figure 4:
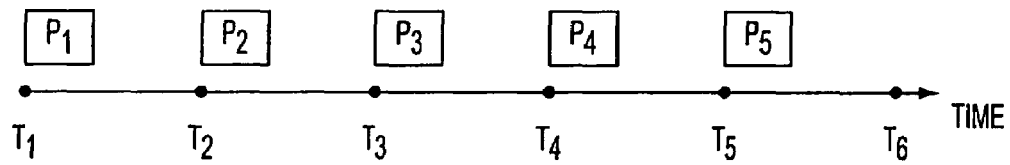
FIG. 4 illustrates delivery of packets having uniform size and a regular delivery time interval according to an embodiment of the invention.
Figure 6:
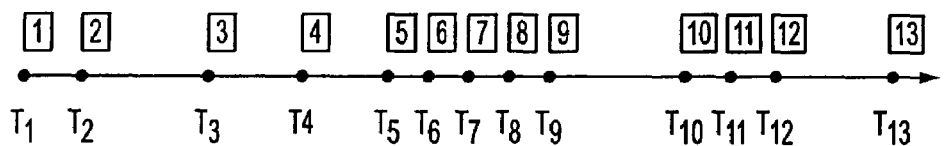
FIG. 6 illustrates delivery of packets having uniform size and a variable delivery time interval according to an embodiment of the invention.

FIG. 3 illustrates functional components included in an embodiment of server 102. Server 102 includes delivery system 200, which obtains content in the form of packetized streaming media assets and delivers it to clients 104. Non-CBR streaming media assets are supported by delivery system 200 as well as streaming media assets having fixed packet sizes and delivery times. As used herein, non-CBR streaming refers to the delivery of variable size packets of data at variable time intervals. That is, packet sizes can vary, and the time interval between packets could vary as well. Delivery system 200 supports non-CBR streaming media assets by associating a time stamp with each packet, and delivering the packet either at or before the time specified in the time stamp. By using time stamped packets, delivery of the packets can be made without missing any deadlines. As illustrated in the FIG. 4, such on time delivery is shown where packet P1 is delivered at time t1, packet P2 is delivered at time t2 and so on. In addition to delivering packets of uniform size at regular intervals, delivery system 200 also supports delivery of variable sized packets at fixed intervals in time (FIG. 5) such as when delivering I, P, or B frame data every ⅓oth of a second. Delivery of fixed size packets at variable intervals in time (FIG. 6) is supported, such as needed by ASF slide presentation authoring tools that attempt to build nearly the same sized packets with very small variation.

While the use of packets with time stamps allows delivery system 200 to support non-CBR delivery, the ability to handle a variety of formats, inputs sources, etc. is desirable. Delivery system 200 utilizes packet producer 202 that can service a variety of input sources such as data read from a file, data received from the network 106, data read from a circular disk buffer while synchronizing with another capture process, and the like. Packet producers 202 are implemented as software modules that acquire data to be streamed to clients 104, parse the acquired data if necessary, and produce time stamped packets for delivery. Packet producers 202 can be specialized to handle specific formats by including, for example, code that parses Quicktime files, locates the hint tracks and constructs the realtime transport protocol (RTP) packets or code that parses ASF files and locates the index entries that are at the end of the file, etc. By providing a plurality of specialized packet producers 202 in delivery system 200, the delivery system can handle data in any anticipated format.

The time stamped packets produced by the packet producer 202 are sent from the packet producer 202 to the time stamped packet queue 204, a data structure that organizes time stamped packets into a first in, first out queue. While the packet producer 202 is a producer of time stamped packets, a feeder software module 206 removes the packets from the queue and delivers them to the client according to the time stamp on each packet. In an embodiment, both packet producers 202 and feeders 206 are active entities (with an associated thread) and the time stamped packet queue 204 is a passive data structure. Each time stamped packet in the queue doesn't need to contain the packet data in the queue verbatim, but only a pointer to where the data is stored, such as in a buffer 208 that is shared with the packet producers 202.

In an embodiment, packet producer 202 includes two software components: stream reader 210 and a stream processor 212. Stream reader 210 produces the data stream by receiving data and sending it to stream processor 212. Stream processor 212 takes the data from stream reader 210, parses it if necessary, and produces time stamped packets. Both stream reader 210 and stream processor 212 are software components that run in a common thread, with stream processor 212 calling stream reader 210 whenever it needs more data.

Figure 7:
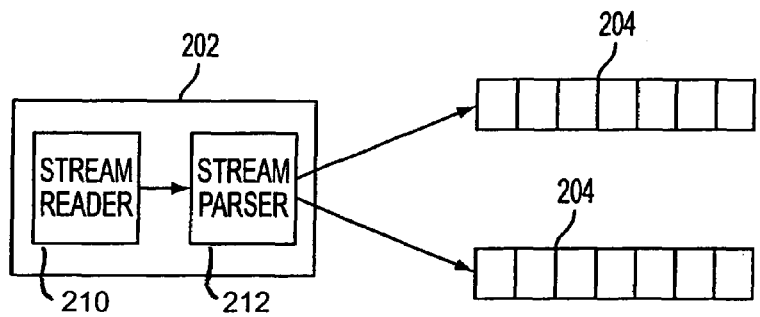
FIG. 7 illustrates a stream processor of the present invention serving as a demultiplexer to produce multiple packet streams according to an embodiment of the invention.

Since the stream processors are format specific in an embodiment, they can be employed to modify the stream when needed. While only three packet producers are shown in FIG. 3, it is to be understood that any number of packet producers can be included and configured to accommodate whatever data and delivery requirements are contemplated. Examples of packet producers include a packet producer for processing ASF files from disk or other storage devices, a packet producer for processing live ASF streams from network 106, a packet producer for processing Quicktime files from disk, a packet producer for processing Quicktime files that have ready made RTP packets, a packet producer for processing ASF streams from shared memory, a packet producer for processing MPEG-4 from disk based circular capture buffer, and a packet producer for MPEG-4 that injects special trailers or modifies the stream in a special way. Stream processors can act as demultiplexers (separating audio and video from a single stream, for example) and feed multiple time stamp packet queues as shown in FIG. 7.

Packet producers 202 are responsible for dealing with any indexing information that the data might have. The index information may be part of the file itself, for example, such as with ASF, or it could be in a separate file, such as implemented in the current MediaBase system available from Kasenna, Inc., of Mountain View, Calif. The packet producers can also hide how fast-forward/rewind is implemented and provide flexibility in different ways of supporting fast-forward/rewind. For example, the packet producer can decide whether to use a separate file for supporting FF/REW, or generate the FF/REW stream from the main file on-the-fly. It should be noted that the time stamp added to a packet by a packet producer is meant to be used by the feeder only, and doesn't necessarily correspond to the exact time of presentation as designated in the original media stream. In the case of reverse-play (rewind), the time stamps seen on the packets in the original media stream are decreasing when the stream is traversed in the reverse order. However, the time stamps produced by the packet producers for this reverse stream will always be increasing as these time stamps correspond to the delivery time to be used by the feeder.

Figure 8:
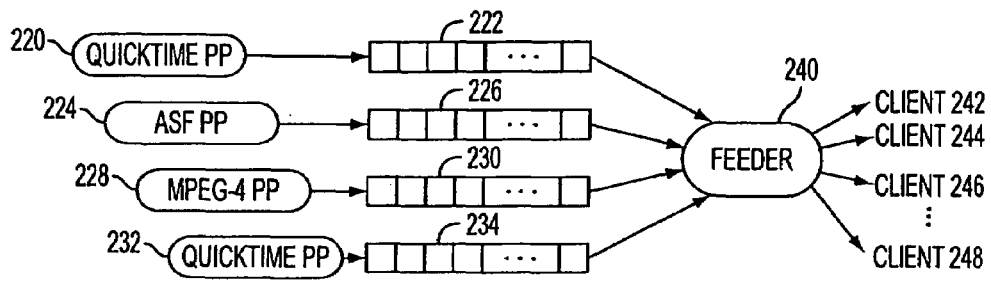
FIG. 8 illustrates an embodiment of the present invention having multiple packet producers to support a variety of data formats.

In an embodiment, there is one packet queue per active stream in delivery system 200. One packet producer is placing packets into a packet queue at a given time, and one feeder is removing packets from the packet queue at a given time. Typically, a feeder will deliver multiple streams, and hence will deliver packets from multiple packet queues. As shown in FIG. 8, packet producer 220 produces QuickTime packets and places them into time stamp packet 222, packet producer 224 produces ASF packets and places them into time stamp packet queue 226, packet producer 228 produces MPEG-4 packets and places them into time stamp packet queue 230, and packet producer 232 produces QuickTime packets and places them into time stamp packet queue 234. Time stamp packet queues 222, 226, 230, and 234 are serviced by feeder 240, which disburses packets from time stamp packet queue 222 to client 242, packets from time stamp packet queue 226 to client 244, packets from time stamp packet queue 230 to client 246, and packets from time stamp packet queue 234 to client 248. However, as shown in FIG. 3, delivery system 200 can have more than one feeder, such as when one feeder cannot take up additional work, and an additional processor is available on which an additional feeder can be started. In such a case, another feeder for processing the extra load is instantiated. Having multiple feeders may not be necessary on a machine having a single processor.

Figure 9:
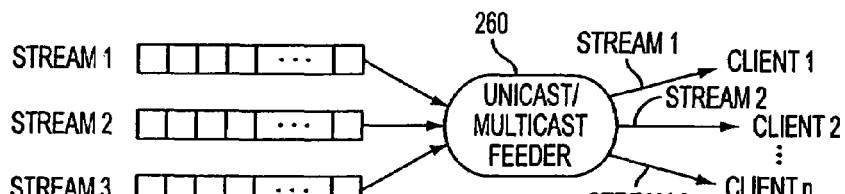
FIG. 9 illustrates an embodiment of a feeder configured to perform multicasts and unicasts.
Figure 10:
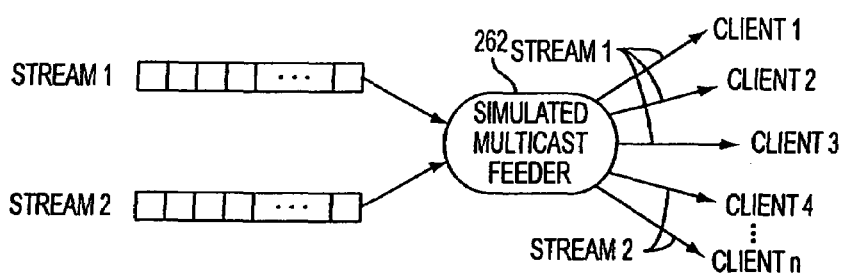
FIG. 10 illustrates an embodiment of a feeder configured to perform simulated multicasts.

Feeders can be configured to perform different types of transmission. As shown in FIG. 9, feeder 260 can be configured to perform standard multicasts and unicasts, where time stamped packet queues feed individual clients. In another embodiment (FIG. 10), feeder 262 can be configured to perform simulated multicasts, where an individual stream can be transmitted to multiple clients. Both types of feeders 260, 262 work with the time stamped packet queue interface and the underlying packet producers don't have to perform any special tasks to accommodate the different types of feeders.

Special cases are accommodated by an embodiment of the feeder of the present invention. One special case involves a situation where two or more packets (possibly from different streams) need to be delivered at precisely the same time. This situation may occur in processing a stream of data conforming to the RTP standard, as the RTP standard allows multiple packets in one stream to have the same time stamp. Since only one packet can be delivered at any given instant, the feeder will miss the deadline for the remaining packets that have the same delivery time specified in its time stamp. A similar situation arises when a feeder ends up spending too much time in sending a large packet, and falling behind the delivery time for the next few packets for other streams handled by the same feeder.

A second special case involves the admission control of streams onto a feeder, namely determining the point beyond which the feeder cannot take up additional streams. If a feeder is currently delivering n streams, and adding an n+1th stream would cause it to miss its deadlines, then the n+1th stream is not added; instead, an additional feeder can be started to handle the stream if possible. In the non-CBR delivery framework, it is difficult to determine whether adding a stream to a feeder would cause it to miss its deadlines.

A scheduling window is defined herein as the time period in which all clients are streamed data that needs to be sent for that time interval. A time to process (TTP) value is defined herein as the time taken to write a data packet to the network. The TTP is calculated for each packet. In a scheduling window, one or more packets may need to be sent that corresponds to a stream. The time to process all these packets is defined as the stream-TTP. With CBR delivery, a stream has the same stream-TTP in every scheduling window. Hence it is easy to determine the point beyond which a feeder cannot take up additional streams. The sum of stream-TTP for all streams cannot exceed the scheduling window. With a constant stream-TTP, it is possible to arrange the delivery schedule such that the feeder is never put into a situation where it has to deliver two packets at precisely the same time (thus avoiding the possibility of missing a deadline). This is done by adjusting the starting time of a stream to make sure that no time clashes will occur between packet time stamps.

Figure 11:
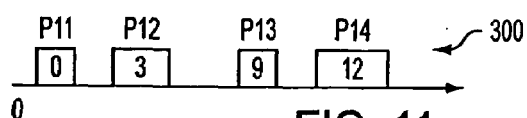
FIG. 11 illustrates an example of individual packet streams having specific delivery time lines according to an embodiment of the invention.
Figure 12:
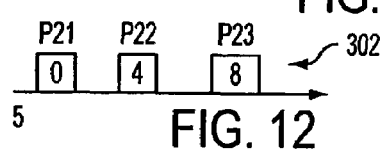
FIG. 12 illustrates another example of individual packet streams having specific delivery time lines according to an embodiment of the invention.
Figure 13:
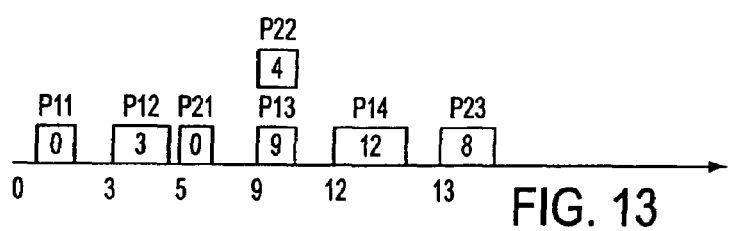
FIG. 13 illustrates the delivery time line of a feeder delivering multiple packet streams having conflicting delivery time lines according to an embodiment of the invention.

In embodiments of the present invention used in non-CBR delivery frameworks, since the time intervals between packets can vary, a packet time stamp conflict can occur rather easily. FIGS. 11 and 12 show two streams 300 and 302 with their own time lines. The packets show their time stamp in their respective stream time lines. FIG. 13 also shows the time line of a feeder delivering these two streams, with stream 300 starting at time 0 and stream 302 starting at time 5 in the feeder's time line. A packet time stamp conflict occurs at time 9, when both P13 and P22 are both due to be delivered.

The present invention solves conflicting packet time stamps by adjusting the time stamps of the packets within an acceptable range so that their time stamps don't conflict. For example, to resolve the conflict illustrated in FIG. 13, either P13 or P22 can be delivered slightly ahead of time, for example, at time T8. If there is another packet (for example, from a third stream) due to be delivered at time T8, then it is moved ahead of its time, for example, to time T7. This time stamp adjustment can propagate to the point where one packet in each stream has its time stamp altered for any given time Tn. Also, the packet may be sent slightly late (for example, at time T10), if a slightly delayed delivery is permissible. This approach requires the feeder to look for time stamp conflicts and reschedule packet send times.

Traditionally, client side buffers located in memory 154 of client 104 are used to smooth out the jitter in the arrival rate of data at the client side. There are two parameters that are critical in client side buffering. They are (i) the amount of data pre-read before the playout starts (pre-read size), and (ii) the size of the client side buffer (max buffer size). The pre-read size and max buffer size parameters impose the maximum limits on how late or how early a packet can arrive. When media is streamed at a fairly constant rate, if the arrival rate of data into the buffer matches the consumption rate of data by the decoder, then there should be pre-read size data left in the buffer. However, since the data can arrive late or early, buffering helps. The pre-read size data in the client's buffer protects against buffer underflow, if the data is not received in time. The max buffer size protects against overflow of the client's buffer if data starts arriving earlier than expected.

Embodiments of the present invention allow a packet's time stamp to be adjusted based on the client side pre-read size and/or max buffer size parameters. Directing attention to FIG. 14, when a client 104 requests delivery of a media asset from server 102, server 102 can query client 104 for values corresponding to the client's pre-read size and max buffer size parameters. If it is known that a client pre-reads one second's worth of data, then a packet going to that client can be delayed up to a maximum of one second. Also, if it is known that client 104 has a max buffer size to hold up to, for example, 10 seconds worth of data, then a packet can be sent to client 104 as early as 10 seconds ahead of its timestamp.

Figure 14A:
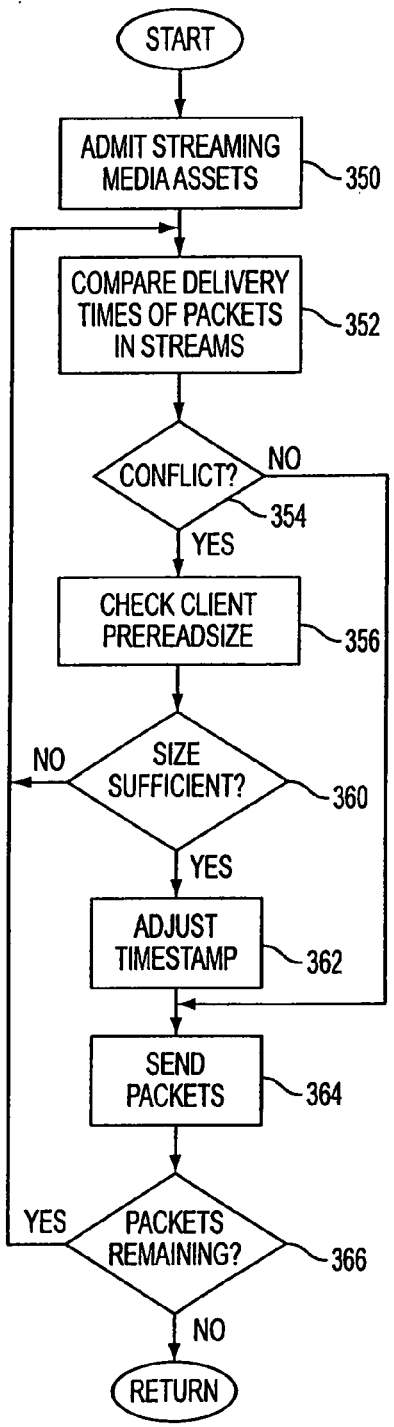
FIGS. 14A and 14B are flowcharts illustrating sequences of steps executed to perform conflict resolution between streaming media assets having packets with conflicting delivery timestamps according to an embodiment of the invention.
Figure 14B:
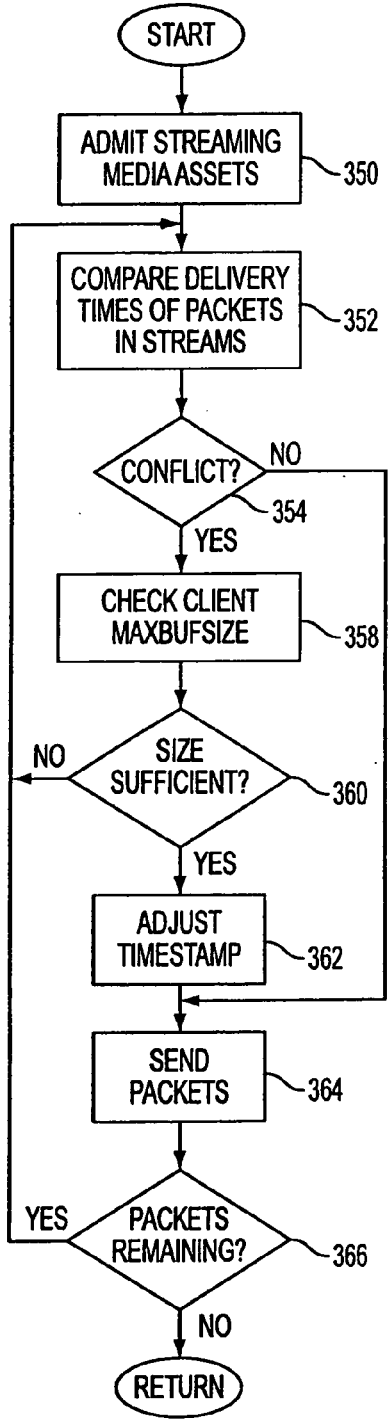

FIGS. 14A and 14B illustrate the sequences of steps executed by embodiments of the present invention to perform conflict resolution between media asset streams having conflicting time stamps. At step 350, the streaming media assets are admitted by server 102 for transmission to clients 104. The delivery times of the packets in the individual media asset streams are compared in step 352. If no conflict is discovered between the time stamps of the streaming media assets admitted for delivery (decision step 354), control proceeds to step 364 and the packets are transmitted to clients 104. If a conflict is discovered at decision step 354 such that two or more packets have matching time stamps, control proceeds to step 356 (FIG. 14A), where the client's pre-read size value is read by server 102. The pre-read size value can be stored on server 102 when a client makes a request for delivery of a media asset. In another embodiment (FIG. 14B), the max buffer size value can be checked (decision step 358) by the server in a similar manner. If the size of the value is sufficient to accommodate a delayed or earlier delivery of the packet (decision step 360), one of the conflicting time stamps is adjusted to a different, non-conflicting delivery time at step 362. Control proceeds to step 364, where the packets are transmitted to clients 104. If there are remaining packets in the streams (decision step 366), control returns to step 352.

It should be noted that the larger the pre-read size value, the longer a packet can be delayed. Also, if the max buffer size value is large, packets can be sent earlier than in cases where the max buffer size is small, thus allowing more flexibility in adjusting the time stamps. However, choosing a large pre-read size is not acceptable for video on demand (VOD) playouts where stream control is provided by means of stop, reposition, and fast forward/rewind controls. A larger pre-read size in such a case results in longer delay when a user does a reposition (i.e. moves the slider icon on a media player interface to access a different part of the stream), or switches from normal speed to fast forward. A delay of more than one second may not be acceptable for such transitions. However, for multicast playouts where stream controls are not provided, choosing a larger pre-read size (for example, pre-reading three seconds' worth of data instead of one second's worth of data) may be acceptable and allows the feeder more flexibility in adjusting the time stamps. As far as choosing a large max buffer size, the main limitation is how much memory a client can afford to allocate.

Also, one second's worth of data for 800 Kbps stream is different from one second's worth of data for 1.5 Mbps stream. That is, the parameters pre-read size and max buffer size are related to the bit rate of the media asset. For example, the pre-read size and max buffer size parameter value can vary between movies that are streamed over network 106. A request for delivery of a media asset, such as an openMovie call made from the client to the server returns these parameters from the server to the client indicating how much buffer should be allocated by the client, and how much data should be pre-read before the playout starts.

For variable bit rate (VBR) streams, computing the pre-read size and max buffer size are a bit complicated, but still possible. The table below shows an example of VBR data arrival at a client. The first row indicates kilobytes of data received during each second. The second and third rows show cumulative numbers of bytes received and consumed (respectively) each second assuming that the data is received and consumed at the same rate, with a three second pre-read delay. The fourth row shows the amount of data remaining in the buffer with this three second pre-read delay.

| Time (in seconds) → | 1 | 2 | 3 | 4 | 5 | 6 | 7 |
|---|---|---|---|---|---|---|---|
| Bytes Received in KB | 7 | 10 | 15 | 12 | 17 | 9 | 18 |
| Cumulative bytes received (KB) | 7 | 17 | 32 | 44 | 61 | 70 | 88 |
| Cumulative bytes consumed (KB) | — | — | — | 7 | 17 | 32 | 44 |
| Bytes left in the buffer (KB) | 7 | 17 | 32 | 37 | 44 | 38 | 44 |

The number of bytes remaining in the buffer at any point in time is a cumulative number of bytes received during the preceding three second window. This means that the pre-read size can be computed as the maximum number of bytes that can be received during any three second time window in the stream. For stored videos, the pre-read size is computed by scanning a file containing the media to be streamed to the client with a moving three second time window and computing the maximum numbers of bytes that can be received during the window. In other words, given such a one or ten second time window the pre-read size for a stored video are computed by scanning the file with a time window of particular size. For live streams, the maximum or average bit rate is used to compute the buffer sizes.

Time windows and space windows are also useful for admission control in feeders. As referred to herein, a space window represents a contiguous amount of data in a media asset file. Space windows can be used when it is optimal to do a unit of work that is expressed in contiguous bytes of data. For example, an essential part of streaming involves retrieving the data to be streamed from a source such as a file system. In many file systems, applications retrieve data from the file system using an optimal I/O size (size S). There are also file systems such as the IRIX XFS file system that allow applications to specify the maximum bit rate at which the application requires to read data; once specified, the file system guarantees that the application will be able to read data at least at the specified rate (rate B). If the media data were delivered at a constant bit rate, it is easy to arrive at the above quantity (B). However, when the media data is to be delivered at a variable bit rate, coming up with the right number for B is difficult. One way to arrive at that number is to divide the total number of bytes in the file by the time in which the data has to be delivered (and therefore retrieved from the file system). However, such an approach can result in not enough data being read on time due to the fact that the media data is delivered with a variable bit rate. In this situation, space windows become useful. It is known that the optimal I/O size is S number of bytes. Scanning the file can reveal the shortest time in which contiguous S bytes have to be delivered. In other words, we scan the file using a space window of S bytes and find out the shortest time in which contiguous S bytes have to be delivered. Dividing the value for S by the time above gives the maximum bit rate requirement of the delivery service (the application) from the file system. Given a space window of some number of bytes (for example, 256K), the file can be scanned with a moving space window to compute the shortest amount of time occupied by such a space window (i.e., the shortest amount of time during which a space window bytes of data need to be delivered). Space windows can form the basis of reserving guaranteed rate input/output (GRIO) bandwidth by the storage manager. Two functions are defined:

(i) bytes timeWindowToBytes (in timeWindowInSeconds), and (ii) seconds spaceWindowToSeconds (in spaceWindowInBytes)

The timeWindowToBytes function scans the file and returns the maximum number of bytes that need to be delivered during a time window period. The spaceWindowToSeconds function scans the file and returns the shortest duration of a space window amount of bytes in the stream.

For admission control of streams within a feeder, embodiments of the present invention utilize a time window for comparison with delivery requirements of streaming media assets. Given a time window of a particular size, a feeder can admit a stream if the stream can be delivered within the time window. For example, given a time window of ten minutes, the maximum numbers of bytes that need to be delivered during a ten minute time window for the stream is computed and then translated into the timeToProcess (in time units). The timeToProcess value can be defined as the time expected to be spent by the Feeder in delivering a certain number of bytes. For a stream to be admissible, the sum of the timeToProcess values for all admitted streams should be lower than the time window size chosen, or an overflow will result. Given a time window of size tw, for each stream, the period of intense activity (of duration tw) is identified and the work expected out of the feeder for such a window is computed. To express this concept in the form of an equation, streams that satisfy the following condition as follows are admitted:

$$\sum_{streams} timeToProcess(timeWindowToBytes(tw)) < tw \qquad (1)$$

Figure 15:
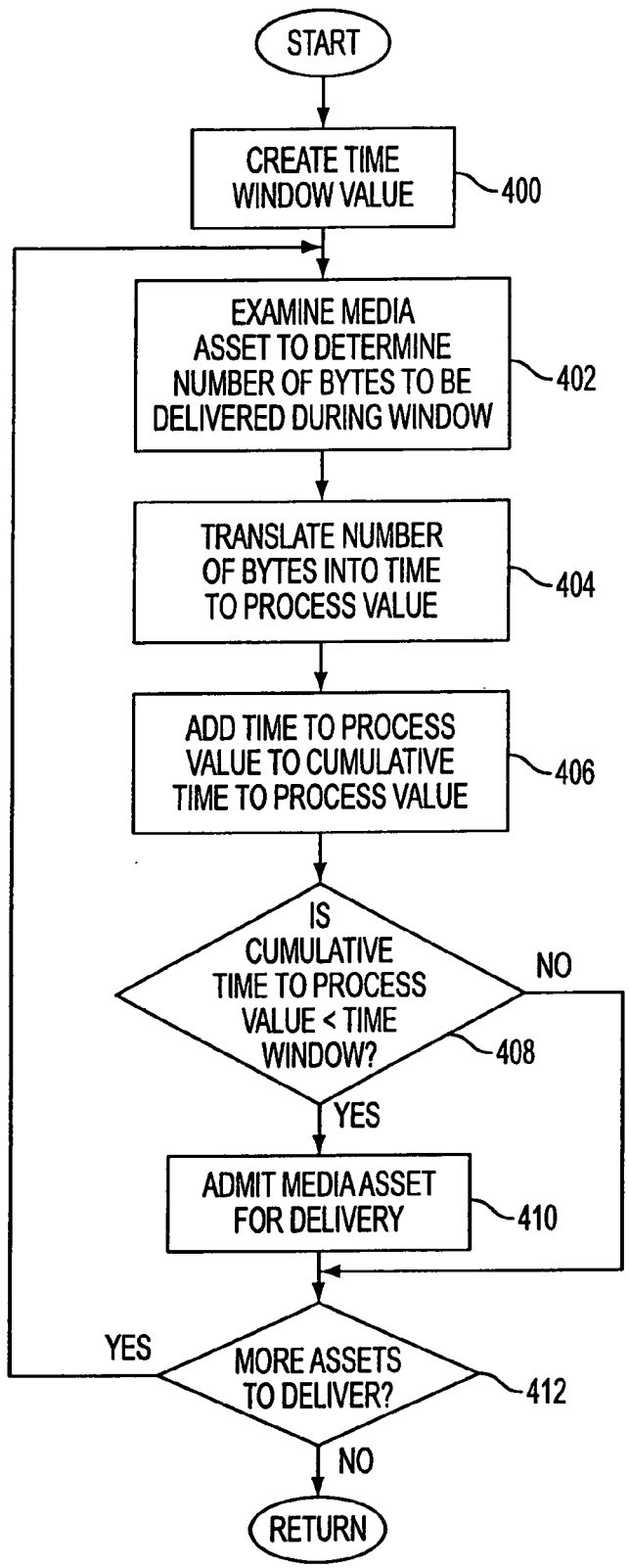
FIG. 15 is a flowchart illustrating a sequence of steps executed to perform admission control of streaming media assets according to an embodiment of the invention.

FIG. 15 illustrates the sequence of steps executed in embodiments of the present invention to perform admission control. Beginning at step 400, the time window value is created. The size of the time window serves as a control for adjusting the averaging behavior expected from the feeder. Generally, the larger the size of the time window, the better the averaging behavior. For example, by choosing a window with a size that corresponds to the duration of the entire media asset, the server gets the best averaging one can ever hope for. A conservative feeder can use a one second time window, while a more optimistic feeder can use a 30 minute time window. For short clips where the duration of the media asset such as a movie clip is less than the window size chosen by the feeder, the media asset's timeToProcess value can be normalized to a larger time window. The window size could also be based in the duration of the media asset (e.g., 50% of duration of the media asset, 80% of the duration of the media asset, etc.) Thus, the time window based admission control scheme uses very simple calculations for admission control. At step 402, the media asset to be streamed is examined to determine the number of bytes to be delivered during the time window. At step 404, the number of bytes to be streamed is translated into a time to process value. At step 406, the time to process value is added to a cumulative time to process value. At decision step 408, if the cumulative time to process value is smaller than the time window, control continues to step 410, where the media asset is admitted for delivery. If there are more assets to be delivered (decision step 412), control returns to step 402.

VBR delivery can be performed as a sequence of CBR delivery runs. Given a VBR traffic of duration d and bit rate b, the server will arrive at a delivery schedule that best represents the original VBR traffic such as {<b1, d1>, b2, d2>, <b3, d3>, . . . }. With this schedule, the server delivers at a constant bit rate b1 for duration d1, then at constant bit rate b2 for duration d2, and so on, where d1+d2+. . . =total duration of the media asset. Such delivery methods are well suited for a feeder that delivers the media asset from the beginning to the end, with no stream control.

It should be noted that the packet producer and feeder based design can easily support VBR delivery as a sequence of CBR runs. The feeders can use the computed delivery schedule to perform admission control. The packet producers can modify the time stamps on the packets in the original stream such that the produced packets have time stamps that conform to the computed delivery schedule.

The time window scheme is used during installation of the asset to coordinate optimal client buffering along with feeder admission control and timely delivery of data. The time window scheme is used by the server to specify the optimal pre-read size and maximum buffer size. The server then uses the knowledge of the client's pre-read and maximum buffer size to handle time stamp conflicts.

Some advanced operating systems such as IRIX provide advanced real time facilities. One such facility is Guaranteed Rate Input/Output (GRIO). File systems that provide such bandwidth support run applications that specify the disk bandwidth guarantee needed to satisfy real time schedules. For example, if a multimedia movie is encoded at 1.5 Mbps, then applications can request the same amount of bandwidth from the GRIO facility. GRIO ensures that the application is able to read the media asset at least at the rate of 1.5 Mbps. Disk reads in file systems that support a GRIO-like feature are issued at a multiple of size known as the optimal I/O size, which is typically 256K bytes in streaming media asset delivery servers. A stored video file can be scanned and the shortest time period during which 256K bytes of data need to be sent to the delivery system 200. The maximum bit rate during any 256K period (of space window) can be computed. This is the peak rate at which I/O requests are issued during playout of a streaming media asset.

Time windows can translate into space windows. A space window is a value associated with an amount of data, for example, 256K bytes. If data is delivered at a constant rate, a time window translates directly to a space window. The bit rates computed using space windows are different from (and usually much slower than) the peak delivery rate. Selecting a space window of size 256K averages the bit rate over the window because the space window is the same size as the optimal I/O size. In general, the larger the window size, the better the averaging behavior. The best average bit rate can be computed by taking the size of the entire file and dividing it by the total duration. That is the same as computing the bit rate over a window of size equal to the size of the entire file. The highest bit rate (also known as the peak bandwidth) of delivery occurs when using a shortest window (for example, one packet), which is the bit rate resulting from taking the largest packet of data that occupies the smallest amount of time in the stream's time line.

Having disclosed exemplary embodiments and the best mode, modifications and variations may be made to the disclosed embodiments while remaining within the scope of the present invention as defined by the following claims.

What is claimed is:

1. A delivery system for use in a client server computer architecture in which the server provides streaming media assets to at least one client over a computer network, wherein the media assets can have a plurality of data formats, comprising:

a packet producer that acquires at least one streaming media asset in packetized form and places time stamps on the packets, each time stamp specifying a delivery time for its respective packet, wherein the packet producer adjusts the delivery time of at least one time stamp in accordance with a value indicating a maximum buffer size of a receiving client;

a time stamp packet queue containing the packets with time stamps in a first in, first out order; and a feeder module that removes packets from the time stamp packet queue and transmits the removed packets to a client via the computer network according to the time stamp in each packet, the transmission for each packet concluded at least by the specified delivery time in each packet;

wherein the feeder module is further operative to control the admission of streaming media assets into the feeder that are to be delivered to a client, the control of admission and comprising:

defining a time window in terms of a first duration of time;

computing a number of bytes that need to be delivered during the time window, the bytes comprising a first streaming media asset;

translating the computed number of bytes into a first time to process value for the first streaming media asset; and admitting for delivery the first streaming media asset if the first time to process value is smaller than the time window.

2. The delivery system of claim 1, wherein the packet producer further comprises:
a stream reader; and
a stream processor.

3. The delivery system of claim 1, further comprising a plurality of packet producers, each packet producer of said plurality supporting a different data format.

4. The delivery system of claim 1, wherein the stream reader obtains a streaming media asset in the form of a packetized stream of data and passes it to the stream processor.

5. The delivery system of claim 4, wherein the stream processor is configured to process data in accordance with a predetermined format and places delivery time stamps on data packets received from the stream reader.

6. The delivery system of claim 4, wherein the stream reader and stream processor share a common thread of control.

7. The delivery system of claim 1, wherein the streaming media asset comprises packets having uniform size and delivery times at irregular intervals.

8. The delivery system of claim 1, wherein the streaming media asset comprises packets having variable size and delivery times at irregular intervals.

9. The delivery system of claim 1, wherein the streaming media asset comprises packets having uniform size and delivery times of regular intervals.

10. The delivery system of claim 1, further comprising multiple feeder modules.

11. The delivery system of claim 1, further comprising multiple time stamped packet queues.

12. A delivery system for use in a client server computer architecture in which the server provides streaming media assets to at least one client over a computer network, wherein the media assets can have a plurality of data formats, comprising:

a packet producer that acquires at least one streaming media asset in packetized form and places time stamps on the packets, each time stamp specifying a delivery time for its respective packet, wherein the packet producer adjusts the delivery time of at least one time stamp in accordance with a value indicating a pre read size capability of a receiving client;

a time stamp packet queue containing the packets with time stamps in a first in, first out order;

a feeder module that removes packets from the time stamp packet queue and transmits the removed packets to a client via the computer network, the transmission for each packet concluded at least by the specified delivery time in each packet;

wherein the feeder module further operative to control the admission of streaming media assets into the feeder that are to be delivered to a client, the control of admission comprising defining a time window in terms of a first duration of time;

computing a number of bytes that need to be delivered during the time window, the bytes comprising a first streaming media asset;

translating the computed number of bytes into a first time to process value for the first streaming media asset; and admitting for delivery the first streaming media asset if the first time to process value is smaller than the time window.

13. The delivery system of claim 12, wherein the packet producer further comprises:
a stream reader; and
a stream processor.

14. The delivery system of claim 12, further comprising a plurality of packet producers, each packet producer of said plurality supporting a different data format.

15. The delivery system of claim 12, wherein the stream reader obtains a streaming media asset in the form of a packetized stream of data and passes it to the stream processor.

16. The delivery system of claim 15, wherein the stream processor is configured to process data in accordance with a predetermined format and places delivery time stamps on data packets received from the stream reader.

17. The delivery system of claim 16, wherein the stream reader and stream processor share a common thread of control.

18. The delivery system of claim 12, wherein the streaming media asset comprises packets having uniform size and delivery times at irregular intervals.

19. The delivery system of claim 12, wherein the streaming media asset comprises packets having variable size and delivery times at irregular intervals.

20. The delivery system of claim 12, wherein the streaming media asset comprises packets having uniform size and delivery times of regular intervals.

21. The delivery system of claim 12, further comprising multiple feeder modules.

22. The delivery system of claim 12, further comprising multiple time stamped packet queues.

23. The delivery system of claim 12, wherein the control of admission further comprising:
computing a number of bytes that need to be delivered during the time window, the bytes comprising at least one additional streaming media asset;
translating the computed number of bytes into at least one additional time to process value for the at least one additional streaming media asset;
adding the at least one additional time to process value to the first time to process value; and
admitting for delivery the at least one additional streaming media asset if the at least one additional time to process value is smaller than the time window.

24. The delivery system of claim 12, wherein the packet producer comprises a stream reader and a stream processor, the stream processor configured to process data in accordance with a predetermined data format, the stream reader obtaining a streaming media asset in the form of a packetized stream of data and passing it to the stream processor, the stream processor placing delivery time stamps on the received data packets, wherein at least one of the time stamps is adjusted for an early delivery in accordance with the receiving client's pre-read size capability.

25. In a delivery system for use in a client server computer architecture in which the server provides streaming media assets that can have a plurality of data formats to at least one client over a computer network, a method for delivering the streaming media assets comprising:
acquiring at least one streaming media asset in packetized form, placing time stamps on the packets specifying a delivery time for its respective packet, and adjusting the delivery time of at least one time stamp in accordance with a value indicating a pre read size capability of a receiving client;
maintaining a time stamp packet queue containing the packets with time stamps in a first in, first out order;
removing packets from the time stamp packet queue and transmitting the removed packets to a client via the computer network according to the time stamp in each packet, the transmission for each packet concluded at least by the specified delivery time in each packet; and
controlling the admission of streaming media assets into the time stamp packet queue that are to be delivered to a client;
wherein the control of admission further comprising:
defining a time window in terms of a first duration of time;
computing a number of bytes that need to be delivered during the time window, the bytes comprising a first streaming media asset;
translating the computed number of bytes into a first time to process value for the first streaming media asset;
adding the first time to process value to a cumulative time to process value; and
admitting for delivery the first streaming media asset if the cumulative time to process value is smaller than the time window.

26. The method for delivering the streaming media assets in claim 25, further comprising: resolving delivery conflicts between at least two streaming media assets delivered simultaneously by the server to at least one client, wherein the at least one client has a pre read size value that indicates a capability of the client to pre read data, the streaming media assets comprising data packets having delivery time stamps.

27. The method for delivering the streaming media assets of claim 26, wherein the resolving of delivery conflicts further comprising:
detecting a delivery conflict between the at least two streaming media assets;
adjusting at least one of the time stamps to indicate an early delivery for at least one of the packets, wherein the adjusted time stamp is adjusted in accordance with the pre read size value; and
delivering the packets at least by times specified by the time stamps.

28. The method for delivering the streaming media assets of claim 27, further comprising the step of the client communicating the pre read size value to the server when the client requests delivery of a streaming media asset.

29. The method for delivering the streaming media assets of claim 28, further comprising the steps of the server communicating to the client an optimum value for the pre read size value; and the client allocating sufficient resources to accommodate the optimum value for the pre read size value.

30. The method for delivering the streaming media assets of claim 25, further comprising: resolving delivery conflicts between at least two streaming media assets delivered simultaneously by the server to at least one client, wherein the at least one client has a max buffer size value that indicates a capability of the client to accept delayed data, the streaming media assets comprising data packets having delivery time stamps.

31. The method for delivering the streaming media assets of claim 30, wherein the resolving of delivery conflicts further comprising:
    detecting a delivery conflict between the at least two streaming media assets;
    adjusting at least one of the time stamps to indicate a delayed delivery for at least one of the packets, wherein the adjusted time stamp is adjusted in accordance with the max buffer size value; and
    delivering the packets at least by times specified by the time stamps.

32. The method for delivering the streaming media assets of claim 31, further comprising the step of the client communicating the max buffer size value to the server when the client requests delivery of a streaming media asset.

33. The method for delivering the streaming media assets of claim 31, further comprising the steps of
    the server communicating to the client an optimum value for the max buffer size value; and
    the client allocating sufficient resources to accommodate the max buffer size value having the optimum value.

34. The method for delivering the streaming media assets of claim 25, further comprising: controlling the admission of streaming media assets into the time stamp packet queue that are to be delivered to a client.

35. The method for delivering the streaming media assets of claim 25, further comprising: resolving delivery conflicts between at least two streaming media assets delivered simultaneously by the server to at least one client, wherein the at least one client has a pre read size value that indicates a capability of the client to pre read data, the streaming media assets comprising data packets having delivery time stamps.

36. The method for delivering the streaming media assets of claim 35, wherein the resolving of delivery conflicts further comprising:
    detecting a delivery conflict between the at least two streaming media assets;
    adjusting at least one of the time stamps to indicate an early delivery for at least one of the packets, wherein the adjusted time stamp is adjusted in accordance with the pre read size value; and
    delivering the packets at least by times specified by the time stamps.

37. The method for delivering the streaming media assets of claim 25, wherein the control of admission comprising:
    providing a space window comprising a value representing an amount of contiguously stored data;
    scanning with the space window a file containing a media asset to be transmitted from the server computer system to the client computer system; and
    returning a value representing the shortest duration of time over which the data contained in the space window can be delivered.

38. A computer program product stored on a computer readable medium for use in a client server computer architecture for delivering streaming media assets that can have a plurality of data formats to at least one client over a computer network, the computer program product including a program module that executes the steps of:
    acquiring at least one streaming media asset in packetized form;
    placing time stamps on the packets specifying a delivery time for its respective packet;
    adjusting the delivery time of at least one time stamp in accordance with a value indicating at least one of a pre read size capability and a maximum buffer size of a receiving client;
    maintaining a time stamp packet queue containing the packets with time stamps in a first-in, first-out order;
    removing packets from the time stamp packet queue and transmitting the removed packets to a client via the computer network according to the time stamp in each packet, the transmission for each packet concluded at least by the specified delivery time in each packet.
    controlling the admission of streaming media assets into the time stamp packet queue that are to be delivered to a client;
    the control of admission further comprising:
        defining a time window in terms of a first duration of time;
        computing a number of bytes that need to be delivered during the time window, the bytes comprising a first streaming media asset;
        translating the computed number of bytes into a first time to process value for the first streaming media asset;
    adding the first time to process value to a cumulative time to process value; and
    admitting for delivery the first streaming media asset if the cumulative time to process value is smaller than the time window.

39. A computer program product as in claim 38, further comprising:
    providing a space window comprising a value representing an amount of contiguously stored data;
    scanning with the space window a file containing a media asset to be transmitted from the server computer system to the client computer system; and
    returning a value representing the shortest duration of time over which the data contained in the space window can be delivered according to time stamps placed in the plurality of packets.

* * * * *